US012202474B2

(12) United States Patent
Ichinokawa et al.

(10) Patent No.: US 12,202,474 B2
(45) Date of Patent: Jan. 21, 2025

(54) ROAD INFORMATION PROCESSING SYSTEM

(71) Applicant: HONDA MOTOR CO., LTD., Tokyo (JP)

(72) Inventors: Jumpei Ichinokawa, Tokyo (JP); Taiki Iwama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 17/953,560

(22) Filed: Sep. 27, 2022

(65) Prior Publication Data

US 2023/0128391 A1   Apr. 27, 2023

(30) Foreign Application Priority Data

Oct. 26, 2021  (JP) .................................. 2021-174747

(51) Int. Cl.
*B60W 30/095* (2012.01)
*B60W 30/12* (2020.01)
(Continued)

(52) U.S. Cl.
CPC ........ *B60W 30/0956* (2013.01); *B60W 30/12* (2013.01); *B60W 40/04* (2013.01); *B60W 40/06* (2013.01); *B60W 2554/402* (2020.02)

(58) Field of Classification Search
CPC .. B60W 30/0956; B60W 30/12; B60W 40/04; B60W 40/06; B60W 2554/402
See application file for complete search history.

(56) References Cited

U.S. PATENT DOCUMENTS

2012/0130595 A1* 5/2012 Hayakawa ............ B60W 30/12
                                                        701/42
2015/0307093 A1   10/2015 Sasabuchi
(Continued)

FOREIGN PATENT DOCUMENTS

JP       2006-313519 A    11/2006
JP       2012-51441 A      3/2012
(Continued)

OTHER PUBLICATIONS

Japanese Office Action dated Apr. 30, 2024 issued in corresponding Japanese application No. 2021-174747; English machine translation included (15 pages).

*Primary Examiner* — Behrang Badii
*Assistant Examiner* — Jay Khandpur
(74) *Attorney, Agent, or Firm* — Rankin, Hill & Clark LLP

(57) ABSTRACT

A road information processing system including: a lane departure prevention information acquisition unit for acquiring lane departure prevention information indicating a time point at which a lane departure prevention process by a lane departure prevention function was executed, and a point where the lane departure prevention process was executed, on a vehicle having the lane departure prevention function; a vehicle behavioral information acquisition unit for acquiring vehicle behavioral information indicating a behavior of the vehicle; and an obstacle recognition unit for recognizing, based on the lane departure prevention information and the vehicle behavioral information, an obstacle present at the point where the lane departure prevention process was executed.

7 Claims, 3 Drawing Sheets

(51) Int. Cl.
*B60W 40/04* (2006.01)
*B60W 40/06* (2012.01)

(56) References Cited

U.S. PATENT DOCUMENTS

| | | | |
|---|---|---|---|
| 2017/0236422 A1* | 8/2017 | Naka | G08G 1/165 |
| | | | 701/301 |
| 2018/0105152 A1* | 4/2018 | Nagae | G08G 1/165 |
| 2019/0070957 A1* | 3/2019 | Nakatsuka | B60K 28/06 |
| 2019/0092338 A1* | 3/2019 | Tsukasaki | B62D 15/029 |
| 2020/0180618 A1* | 6/2020 | Ohmura | B60W 50/12 |
| 2021/0146958 A1* | 5/2021 | Tanaka | B60W 30/18159 |

FOREIGN PATENT DOCUMENTS

| | | |
|---|---|---|
| JP | 2015-210572 A | 11/2015 |
| JP | 2016-62157 A | 4/2016 |
| JP | 6172020 B2 | 8/2017 |
| JP | 2019-185111 A | 10/2019 |
| JP | 2020-13537 A | 1/2020 |

* cited by examiner

ROAD INFORMATION PROCESSING SYSTEM

INCORPORATION BY REFERENCE

The present application claims priority under 35 U.S.C. § 119 to Japanese Patent Application No. 2021-174747 filed on Oct. 26, 2021. The content of the application is incorporated herein by reference in its entirety.

BACKGROUND OF THE INVENTION

Field of the Invention

The present invention relates to a road information processing system.

Description of the Related Art

Conventionally, there has been proposed a road surface state estimation device that determines, based on behavioral information acquired from a vehicle, whether or not an anomaly condition that is based on a specific behavior is satisfied, the specific behavior being that the vehicle encountering a road surface anomaly is supposed to perform, and thereby estimates a state of the road surface (see, for example, Japanese Patent Laid-Open No. 2020-13537).

Moreover, there has been proposed a device for preventing parking without leaving enough space. This device calculates the distance from a right side surface of a parked vehicle to a right side boundary of a road, based on an image of surroundings of the parked vehicle, so as to recognize the vehicle parked without leaving enough space, and notifies a driver of the vehicle that the vehicle is parked without leaving enough space (see, for example, Japanese Patent No. 6172020).

The device of Japanese Patent Laid-Open No. 2020-13537 is for estimating the state of the road surface, and therefore there is a problem that information about an obstacle on the road, such as a vehicle parked without leaving enough space, cannot be acquired. Further, the device of Japanese Patent No. 6172020 is for recognizing parking of a vehicle without leaving enough space, the vehicle being equipped with the device, and for warning the driver. Therefore, the acquired information is extremely limited to parking of a specific vehicle without leaving enough space, and there is a problem that information about obstacles on the road, such as vehicles parked without leaving enough space, cannot be acquired for a wide range of area.

The present invention was made in view of such a background, and the purpose of the invention is to provide a road information processing system capable of acquiring information about an obstacle on a road in a wide range of area.

SUMMARY OF THE INVENTION

As one aspect of the present invention to satisfy the purpose, there is provided a road information processing system including: a lane departure prevention information acquisition unit for acquiring lane departure prevention information indicating a time point at which a lane departure prevention process by a lane departure prevention function was executed, and a point where the lane departure prevention process was executed, on a vehicle having the lane departure prevention function; a vehicle behavioral information acquisition unit for acquiring vehicle behavioral information indicating a behavior of the vehicle; and an obstacle recognition unit for recognizing, based on the lane departure prevention information and the vehicle behavioral information, an obstacle present at the point where the lane departure prevention process was executed.

In the road information processing system, the obstacle recognition unit may be configured to recognize the obstacle, based on a road-width-direction behavior that is a behavior of the vehicle in a width direction of a road on which the vehicle is traveling, during a period in which the lane departure prevention process was executed, the road-width-direction behavior being recognized from the lane departure prevention information and the vehicle behavioral information.

In the road information processing system, the obstacle recognition unit may be configured to recognize the obstacle, based on the road-width-direction behavior in a predetermined time from a time point at which the lane departure prevention process was started within the period in which the lane departure prevention process was executed, the road-width-direction behavior being recognized from the lane departure prevention information and the vehicle behavioral information.

In the road information processing system, the obstacle recognition unit may be configured to determine whether the obstacle is present or not, based on whether there is a behavior of the vehicle returning to an own lane, which is recognized from the road-width-direction behavior, or a time point at which the behavior of the vehicle returning to the own lane was recognized from the road-width-direction behavior.

In the road information processing system, the obstacle recognition unit may be configured to determine that the obstacle is present if the behavior of the vehicle returning to the own lane was not recognized from the road-width-direction behavior, or if an elapsed time from the start of the lane departure prevention process to a time point at which the behavior of the vehicle returning to the own lane was recognized from the road-width-direction behavior is equal to or more than a predetermined time.

The road information processing system may have a lane departure degree recognition unit for recognizing the degree of departure of the vehicle from the own lane, and the obstacle recognition unit may be configured to estimate a size of the obstacle, based on the degree of departure of the vehicle from the own lane recognized by the lane departure degree recognition unit when the lane departure prevention process was executed.

In the road information processing system, the obstacle recognition unit may be configured to estimate a type of the obstacle, based on an attribute of the point where the obstacle was recognized.

In the road information processing system, the obstacle recognition unit may be configured to estimate a type of the obstacle, based on a time during which the obstacle present at the same point is continuously recognized a plurality of times based on a plurality of pieces of the lane departure prevention information about a plurality of the vehicle, and the vehicle behavioral information.

In the road information processing system, the obstacle recognition unit may be configured to estimate a type of the obstacle, based on a time point at which the obstacle was recognized.

According to the road information processing system, it is possible to acquire information about an obstacle on a road in a wide range area.

DETAILED DESCRIPTION OF THE PREFERRED EMBODIMENTS

Figure 1:
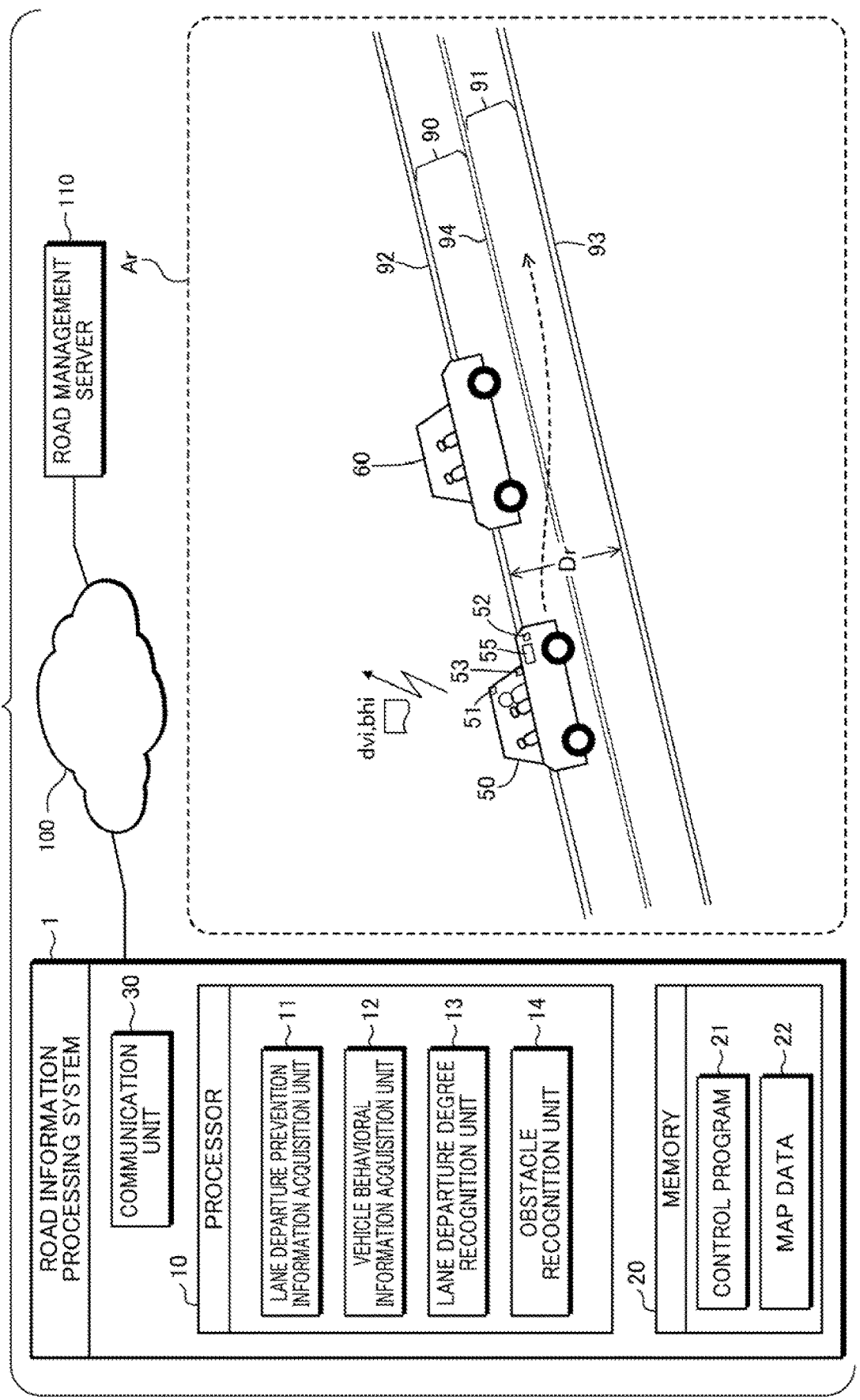
FIG. 1 is a configuration diagram of a road information processing system.

1. Configuration of Road Information Processing System

A configuration of a road information processing system 1 of the present embodiment will be described with reference to FIG. 1. The road information processing system 1 is a computer system including a processor 10, a memory 20, a communication unit 30, etc.

The road information processing system 1 uses the communication unit 30 to allow communication between a road management server 110 and a vehicle 50 traveling on a road within an area Ar, via a communication network 100. The area Ar is an area in which communication with the road information processing system 1 is available. The vehicle 50 has a camera 51 for capturing a forward view, sensors 52 for detecting a behavior of the vehicle 50, an alarm device 53 for outputting an alarm to a driver of the vehicle 50, and an electronic control unit (ECU) 55 for controlling an operation of the vehicle 50.

The ECU 55 has a lane departure prevention function that recognizes divider lines 92, 93, 94 of the road from an image of a forward view of the vehicle 50 captured by the camera 51, monitors a departure of the vehicle 50 from an own lane 90 to an opposing lane 91, and executes a departure prevention process. Upon detection of the departure of the vehicle 50 from the own lane 90, the ECU 55 executes a process for warning the driver by outputting an alarm from the alarm device 53, as the lane departure prevention process. The alarm device 53 is a display, a speaker, etc. to output an alarm indication to the display, a warning sound or the like from the speaker, as an alarm.

When the alarm was output by the lane departure prevention function, the ECU 55 transmits, to the road information processing system, lane departure prevention information dvi indicating a state when the alarm was output. The lane departure prevention information dvi includes information about a time point (period) when the alarm was output, and a point where the alarm was output.

The sensors 52 for detecting the behavior of the vehicle 50 include a global navigation satellite system (GNSS) sensor for detecting the current location of the vehicle 50, a 3-axis acceleration sensor, a 3-axis gyro sensor (angular velocity sensor), a steering angle sensor, etc. The ECU 55 transmits, to the road information processing system 1, vehicle behavioral information bhi indicating a behavioral state of the vehicle 50 detected by the sensors 52 when the alarm was output by the lane departure prevention function.

The processor 10 of the road information processing system 1 reads and executes a control program 21 stored in the memory 20, thereby functioning as a lane departure prevention information acquisition unit 11, a vehicle behavioral information acquisition unit 12, a lane departure degree recognition unit 13, and an obstacle recognition unit 14.

The lane departure prevention information acquisition unit 11 receives and acquires, through the communication unit 30, the lane departure prevention information dvi transmitted from the vehicle 50. The vehicle behavioral information acquisition unit 12 receives and acquires, through the communication unit 30, the vehicle behavioral information bhi transmitted from the vehicle 50. The lane departure degree recognition unit 13 recognizes, based on the lane departure prevention information dvi and the vehicle behavioral information bhi, the degree of departure of the vehicle 50 from the own lane 90 when the alarm was output by the lane departure prevention function.

The lane departure degree recognition unit 13 recognizes an obstacle present on the road by recognizing, based on the lane departure prevention information dvi and the vehicle behavioral information bhi, the behavior of the vehicle 50 when the alarm was output by the lane departure prevention function of the vehicle 50. The obstacle is, for example, a parked vehicle, a place under construction, etc. In FIG. 1, a vehicle 60 parked without leaving enough space, which is parked without leaving enough space for allowing traveling on the right side of the own lane 90 (opposing lane side) is shown as an example.

In recent years, vehicles having a lane departure prevention function similar to that of the vehicle 50 are widespread, and the lane departure prevention information dvi and the vehicle behavioral information bhi are transmitted to the road information processing system 1 from these vehicles traveling on roads within the area Ar. The road information processing system 1 can recognize, based on the lane departure prevention information dvi and the vehicle behavioral information bhi transmitted from these vehicles, an obstacle present on a road within a wide range of area Ar.

2. Obstacle Information Acquisition Process

According to the flowchart shown in FIG. 2, a process for acquiring information about an obstacle present on a road, which is executed by the road information processing system 1 in the state shown in FIG. 1, will be explained. The road information processing system 1 recognizes an obstacle present on a road on which the vehicle 50 is traveling.

In step S1 in FIG. 2, the lane departure prevention information acquisition unit 11 receives and acquires, through the communication unit 30, the lane departure prevention information dvi transmitted from the vehicle 50 to be monitored (hereinafter referred to as the subject vehicle 50). In subsequent step S2, the vehicle behavioral information acquisition unit 12 receives and acquires, through the communication unit 30, the vehicle behavioral information bhi transmitted from the subject vehicle 50.

In subsequent step S3, the obstacle recognition unit 14 recognizes, from the lane departure prevention information dvi, a period in which an alarm was output by the lane departure prevention function of the subject vehicle 50. In the next step S4, the obstacle recognition unit 14 recognizes, from the vehicle behavioral information bhi, a behavior (road-width-direction behavior) of the subject vehicle 50 in a direction Dr of the road width (see FIG. 1) in the period in which the alarm was output by the lane departure prevention function. The obstacle recognition unit 14 recognizes the road-width-direction behavior, based on information included in the vehicle behavioral information bhi, such as an angular velocity, acceleration, and steering angle, detected by the sensors 52 of the subject vehicle 50.

In the next step S5, the obstacle recognition unit 14 determines whether a behavior of the subject vehicle 50 returning to the own lane 90 was recognized from the road-width-direction behavior. Then, the obstacle recognition unit 14 proceeds to step S20 if the behavior returning to the own lane 90 was recognized, or proceeds to step S6 if the behavior returning to the own lane 90 was not recognized.

In step S20, the obstacle recognition unit 14 determines whether an elapsed time from a time point at which outputting an alarm by the lane departure prevention function was started to a time point at which the behavior of the subject vehicle 50 returning to the own lane 90 occurred is a predetermined time or more. Then, the obstacle recognition unit 14 proceeds to step S6 if the elapsed time is equal to or more than the predetermined time, or proceeds to step S21 if the elapsed time is less than the predetermined time. In step S21, the obstacle recognition unit 14 determines that there is no obstacle on the road, and proceeds the process to step S11.

Figure 3:
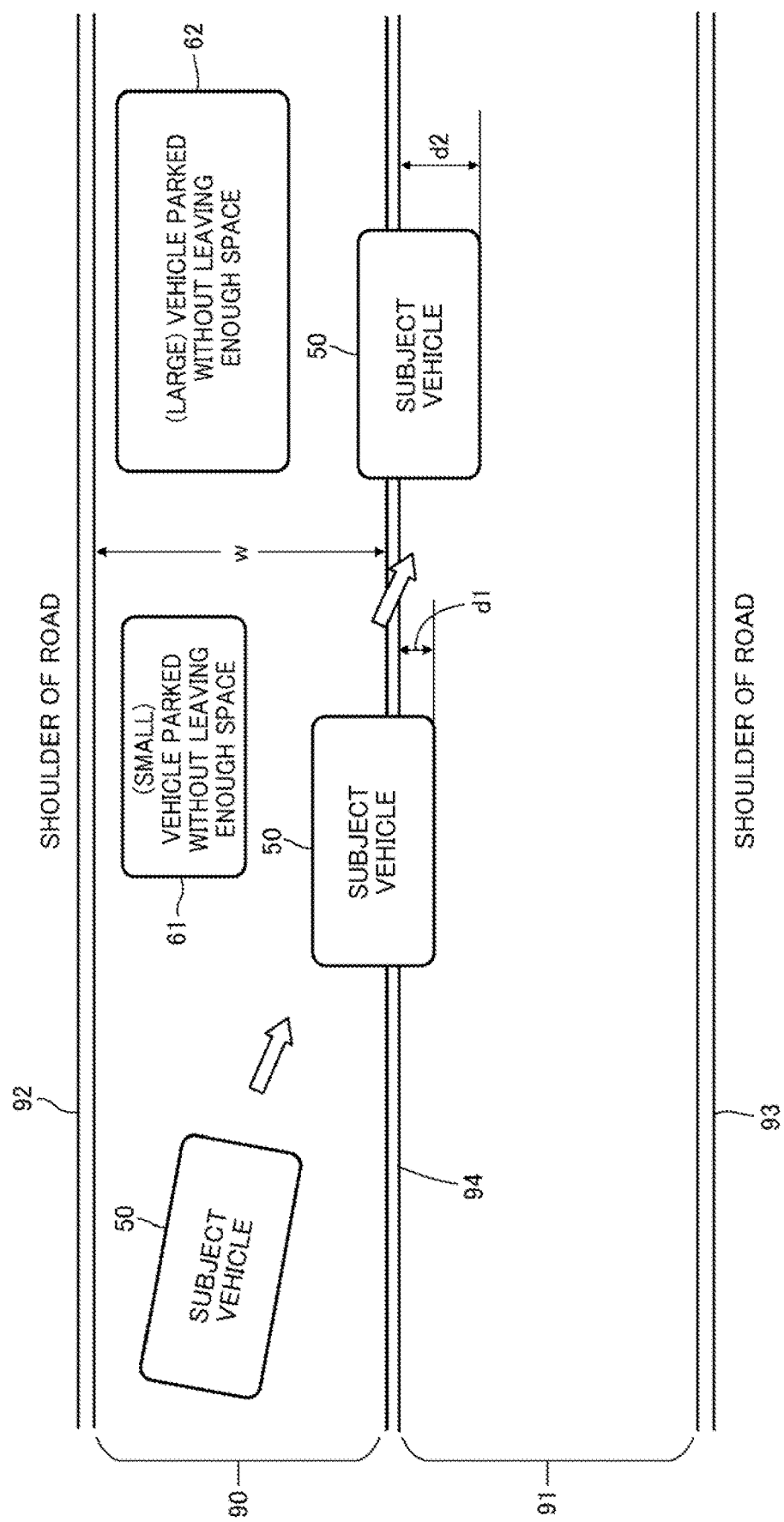
FIG. 3 is an explanatory view of a process for estimating the size of the obstacle, based on the degree of departure from own lane.

In step S6, the lane departure degree recognition unit 13 recognizes the degree of departure of the subject vehicle 50 from the own lane 90 with reference to the road-width-direction behavior recognized from the vehicle behavioral information bhi. FIG. 3 shows an example of a state in which a small vehicle 61 parked without leaving enough space and a large vehicle 62 parked without leaving enough space are present as obstacles on the own lane 90 of the subject vehicle 50.

As shown in FIG. 3, regarding the degree of departure (here, the amount of departure) of the subject vehicle 50 from the own lane 90, a departure amount d2 when the subject vehicle 50 is traveling while avoiding the large vehicle 62 parked without leaving enough space is more than a departure amount d1 when the subject vehicle 50 is traveling while avoiding the small vehicle 61 parked without leaving enough space. Moreover, the greater the width W of the own lane 90 recognized from map data 22, the smaller the degree of departure of the subject vehicle 50 from the own lane 90. Therefore, in subsequent step S8, the obstacle recognition unit 14 estimates that the larger the departure degree of the subject vehicle 50 from the own lane 90 recognized by the lane departure degree recognition unit 13 and the greater the width W of the own lane 90, the larger the size of the obstacle.

Note that the width W of the own lane 90 and the departure amounts d1, d2 of the subject vehicle 50 from the own lane 90 may be recognized from the image captured by the camera 51 (see FIG. 1). In this case, for example, the image captured by the camera 51 when the alarm was output by the lane departure prevention function is included in the vehicle behavioral information bhi, and is transmitted from the vehicle 50 to the road information processing system.

In subsequent step S9, the obstacle recognition unit 14 estimates a type of the obstacle from the type estimation conditions given below.

(Estimation Condition 1) The obstacle recognition unit 14 estimates the type of an obstacle, based on an attribute of a point (recognized from the map data 22) where an alarm was output by the lane departure prevention function. For example, when the attribute of the point where the alarm was output by the lane departure prevention function is around a store, the obstacle recognition unit 14 estimates that the type of the obstacle is a vehicle parked on a shoulder of a road.

(Estimation Condition 2) The obstacle recognition unit 14 estimates the type of an obstacle, based on the time during which an obstacle present at the same point was continuously recognized a plurality of times based on the lane departure prevention information dvi and the vehicle behavioral information bhi transmitted from a plurality of vehicles. For example, the time during which the obstacle present at the same point was continuously recognized a plurality of times is equal to or less than a short time threshold (for example, one hour), the obstacle recognition unit 14 estimates that the type of the obstacle is a vehicle parked on a shoulder of a road. Moreover, when the time during which the obstacle present at the same point was continuously recognized a plurality of times is equal to or more than a long time threshold (for example, a few hours), the obstacle recognition unit 14 estimates that the type of the obstacle is roadwork.

(Estimation Condition 3) The obstacle recognition unit 14 estimates the type of an obstacle, based on a time point at which the obstacle was recognized (the time point at which an alarm was output by the lane departure prevention function). For example, if the time point at which the obstacle was recognized is Saturday or Sunday, the obstacle recognition unit 14 estimates that the type of the obstacle is a vehicle parked on a shoulder of a road. Moreover, if the time point at which the obstacle was recognized is at night, the obstacle recognition unit 14 estimates that the type of the obstacle is roadwork.

In the next step S10, the obstacle recognition unit 14 transmits the information about the recognized obstacle to the road management server 110 through the communication unit 30. The information about the obstacle includes the time point at which the obstacle was recognized, the point where the obstacle is present, the size of the obstacle, the type of the obstacle, etc. Furthermore, the obstacle recognition unit 14 may determine, based on the obstacle recognition state (such as the recognized frequency, and the length of the period in which the obstacle was continued to be recognized), that the point where parking a vehicle without leaving enough space occurs frequently is an attention-required point, and may include information about the attention-required point in the obstacle information, and transmit the information to the road management server 110.

The cause of frequent occurrence of vehicle parked without leaving enough space may include vehicles which stopped to wait for entering a store. In this case, a traveling vehicle cannot advance without crossing the divider line of the road, and the vehicle needs to cross the divider line and depart from the own lane, and therefore the obstacle recognition unit 14 determines that the point is an attention-required point.

Moreover, it is supposed that a departure from the own lane by the driver's intentional maneuvering is likely occur at a curve with good visibility, irrespective of the purpose of avoiding an obstacle. Therefore, in a section with a large curvature of the road, a threshold for determining an attention-required point may be set high to prevent the obstacle recognition unit 14 from erroneously recognizing the presence of an obstacle because of frequent departures, despite the fact that no obstacle is actually present.

The road management server 110, for example, defines, based on the obstacle information, that a road at a point where parking a vehicle without leaving enough space occurs frequently is the road requiring improvements, and uses this information for road maintenance in the future. Further, the road management server 110 may transmit the information about the attention-required point to vehicles that are likely to travel toward the attention-required point where parking a vehicle without leaving enough space occurs frequently. Furthermore, information for guiding a route for avoiding the attention-required point may be transmitted upon a request from a driver.

3. Another Embodiment

In the above embodiment, the road information processing system 1 is configured by the computer system connected to the communication network 100 is explained as an example. As another embodiment, a road information processing system may be configured by the ECU 55 mounted on the vehicle 50. In this case, the information about an obstacle recognized by the vehicle 50 is transmitted from the vehicle 50 to the road management server 110 via the communication network 100.

Figure 2:
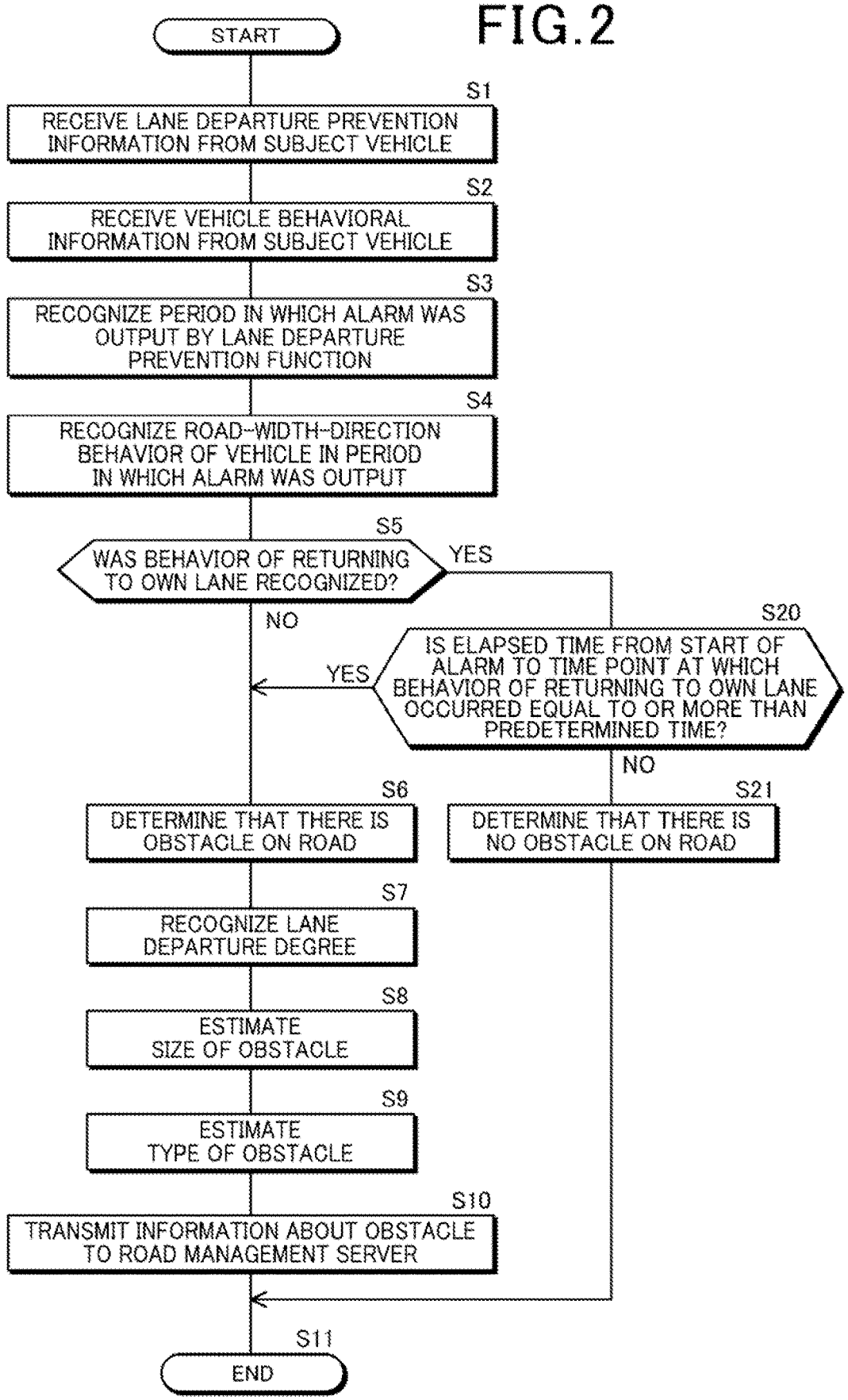
FIG. 2 is a flowchart of a process for acquiring information about an obstacle on a road.

In the above embodiment, the road information processing system 1 includes the lane departure degree recognition unit 13, and estimates the size of the obstacle by the process in steps S7 to S8 in FIG. 2, but the road information processing system 1 may be configured by omitting the lane departure degree recognition unit 13.

In the above embodiment, the type of the obstacle is estimated by the process in step S9 in FIG. 2, but the road information processing system 1 may be configured by omitting the estimation of the obstacle.

In the above embodiment, as the lane departure prevention process by the lane departure prevention function of the vehicle 50, the process for outputting an alarm from the alarm device 53 is shown as an example. The lane departure prevention process by the lane departure prevention function includes a process for controlling the steering angle of steering of the vehicle 50 in a direction of returning the vehicle 50 to the own lane 90, and a process for warning the driver by vibrating the steering of the vehicle 50 as well as outputting an alarm.

In the above embodiment, the obstacle recognition unit 14 may perform the following processes by calculating a steering angular velocity, based on the detected information from the steering angle sensor, included in the vehicle behavioral information bhi. The steering angular velocity is the amount of change of the steering angle per unit time, which is detected by the steering angle sensor.

Process 1: Recognizing whether or not there is an obstacle, based on the magnitude of the steering angular velocity. That is to say, when the steering angular velocity is greater than a predetermined velocity, it is determined that the operation is not for avoiding the obstacle, and may be excluded from the subject of determination as to whether there is an obstacle.

Process 2: Determining the type of an obstacle, based on the magnitude of the steering angular velocity. That is to say, when the steering angular velocity is greater than the predetermined velocity, it may be possible to estimate that there was an obstacle that was hard to predict and appeared momentarily, such as a sudden appearance. Moreover, when the steering angular velocity is smaller than the predetermined velocity, it may be possible to estimate that there was a fixed obstacle, such as a parked vehicle or roadwork, which is visible from a distant place.

Note that, in order to facilitate understanding of the invention of the present application, FIG. 1 is a schematic view in which the configuration of the road information processing system 1 is divided and shown depending on major processing contents, but the road information processing system 1 may be configured with other division. Further, the processing of components may be executed by a single hardware unit, or may be executed by a plurality of hardware units. Furthermore, the processing by the respective components in the flowchart shown in FIG. 2 may be executed by a single program, or may be executed by a plurality of programs.

4. Configurations Supported by Above Embodiment

The above embodiment supports the following configurations.

(Configuration 1) A road information processing system including: a lane departure prevention information acquisition unit for acquiring lane departure prevention information indicating a time point at which a lane departure prevention process by a lane departure prevention function was executed, and a point where the lane departure prevention process was executed, on a vehicle having the lane departure prevention function; a vehicle behavioral information acquisition unit for acquiring vehicle behavioral information indicating a behavior of the vehicle; and an obstacle recognition unit for recognizing, based on the lane departure prevention information and the vehicle behavioral information, an obstacle present at the point where the lane departure prevention process was executed.

According to the road information processing system of configuration 1, it is possible to acquire information about an obstacle on a road in a wide range area, based on the lane departure prevention information and the vehicle behavioral information about a vehicle traveling on an arbitrary road.

(Configuration 2) The road information processing system defined in configuration 1, wherein the obstacle recognition unit recognizes the obstacle, based on a road-width-direction behavior that is a behavior of the vehicle in the width direction of a road on which the vehicle is traveling, during a period in which the lane departure prevention process was executed, the road-width-direction behavior being recognized from the lane departure prevention information and the vehicle behavioral information.

According to the road information processing system of configuration 2, it is possible to recognize the obstacle on the road, based on a behavior of the vehicle in the road width direction that is a direction in which the vehicle departs from own lane and returns to the own lane, during the period in which the vehicle departed from the own lane, and the lane departure prevention process by the lane departure prevention function was executed.

(Configuration 3) The road information processing system defined in configuration 2, wherein the obstacle recognition unit recognizes the obstacle, based on the road-width-direction behavior in a predetermined time from a time point at which the lane departure prevention process was started, within the period in which the lane departure prevention process was executed, the road-width-direction behavior being recognized from the lane departure prevention information and the vehicle behavioral information.

According to the road information processing system of configuration 3, it is possible to estimate whether an obstacle that prevents the vehicle from quickly returning to the own lane is present or not, based on the behavior of the vehicle in the road width direction in the predetermined time from the time point at which the vehicle departed from the own lane, and the lane departure prevention process by the lane departure prevention function was started.

(Configuration 4) The road information processing system defined in configuration 2 or configuration 3, wherein the obstacle recognition unit determines whether the obstacle is present or not, based on whether there is a behavior of the vehicle returning to the own lane, which is recognized from the road-width-direction behavior, or a time point at which the behavior of the vehicle returning to the own lane was recognized from the road-width-direction behavior.

According to the road information processing system of configuration 4, it is possible to estimate from the presence or absence of a behavior of the vehicle returning to the own lane, or a time point at which the behavior of the vehicle returning to the own vehicle was recognized, whether an obstacle that prevents the vehicle from returning to the own lane is present or not.

(Configuration 5) The road information processing system defined in configuration 4, wherein the obstacle recognition unit determines that the obstacle is present if the behavior of the vehicle returning to the own lane was not recognized from the road-width-direction behavior, or if an elapsed time from the start of the lane departure prevention process to the time point at which the behavior of the vehicle returning to the own lane was recognized from the road-width-direction behavior is equal to or more than a predetermined time.

According to the road information processing system of configuration 5, if the behavior of the vehicle returning to the own lane was not recognized, or if the elapsed time from the start of the lane departure prevention process to the time point at which the behavior of the vehicle returning to the own lane was recognized is equal to or more than the predetermined time, it is possible to estimate that an obstacle that prevents the vehicle from returning to the own lane is present.

(Configuration 6) The road information processing system defined in any one of configuration 1 to configuration 5, including a lane departure degree recognition unit for recognizing the degree of departure of the vehicle from an own lane, wherein the obstacle recognition unit estimates a size of the obstacle, based on the degree of departure of the vehicle from the own lane recognized by the lane departure degree recognition unit when the lane departure prevention process was executed.

According to the road information processing system of configuration 6, it is estimated that the larger the size of the obstacle on the road, the larger the degree of departure of the vehicle from the own lane. Therefore, it is possible to estimate the size of the obstacle, based on the degree of departure of the vehicle from the own lane when the lane departure prevention process was executed.

(Configuration 7) The road information processing system defined in any one of configuration 1 to configuration 6, wherein the obstacle recognition unit estimates a type of the obstacle, based on an attribute of the point where the obstacle was recognized.

According to the road information processing system of configuration 7, for example, if the point where the obstacle was recognized is around a store, the type of the obstacle can be estimated as a vehicle parked on a shoulder of the road.

(Configuration 8) The road information processing system as defined in any one of configuration 1 to configuration 7, wherein the obstacle recognition unit estimates a type of the obstacle, based on a time during which the obstacle present at the same point is continuously recognized a plurality of times based on a plurality of pieces of the lane departure prevention information about a plurality of the vehicle, and the vehicle behavioral information.

According to the road information processing system of configuration 8, for example, if the time during which the obstacle present at the same point was recognized is a short time, the type of the obstacle can be estimated as a vehicle parked on a shoulder of the road, and if the time is a long time, the type of the obstacle can be estimated as roadwork.

(Configuration 9) The road information processing system defined in any one of configuration 1 to configuration 8, wherein the obstacle recognition unit estimates a type of the obstacle, based on a time point at which the obstacle was recognized.

According to the road information processing system of configuration 9, for example, if the time point at which the obstacle was recognized is Saturday or Sunday, the type of the obstacle can be estimated as a vehicle parked on a shoulder of the road, and if the time point at which the obstacle was recognized is at night, the type of the obstacle can be estimated as roadwork.

REFERENCE SIGNS LIST 1 road information processing system;
10 processor;
11 lane departure prevention information acquisition unit;
12 vehicle behavioral information acquisition unit;
13 lane departure degree recognition unit;
14 obstacle recognition unit;
20 memory;
21 control program;
22 map data;
50 vehicle (own vehicle);
51 camera;
52 speaker;
53 sensors;
55 ECU;
60, 61, 62 parked vehicle;
90 own lane;
92 opposing lane; and
91, 92, 93 divider line of road.

What is claimed is:

1. A road information processing system comprising a processor, wherein the processor functions as:
   a lane departure prevention information acquisition unit for: recognizing a divider line of a road from an image of a forward view of a vehicle captured by a camera; monitoring a departure of the vehicle from an own lane in which the vehicle drives to an opposing lane; acquiring lane departure prevention information transmitted from the vehicle having a lane departure prevention function that executes a lane departure prevention process of preventing the departure; and indicating a time point at which the lane departure prevention process by the lane departure prevention function was executed, and a point where the lane departure prevention process was executed;
   a vehicle behavioral information acquisition unit for acquiring vehicle behavioral information that is transmitted from the vehicle and that indicates a behavior of the vehicle detected by a sensor provided on the vehicle;
   a lane departure degree recognition unit for recognizing a degree of departure of the vehicle from the own lane when an alarm is output by the lane departure prevention function based on the lane departure prevention information and the vehicle behavioral information; and
   an obstacle recognition unit for recognizing, based on a road-width-direction behavior that is recognized from the lane departure prevention information and the vehicle behavioral information, and that is a behavior of the vehicle in a road-width-direction on which the vehicle is traveling during a period in which the lane departure prevention process is executed, an obstacle present in the road-width-direction at the point where the lane departure prevention process was executed, and for estimating a size of the obstacle present in the road-width-direction based on the degree of departure recognized by the lane departure degree recognition unit.

2. The road information processing system according to claim 1, wherein the processor, by the function of the obstacle recognition unit, recognizes the obstacle, based on the road-width-direction behavior in a predetermined time from a time point at which the lane departure prevention process was started, within the period in which the lane departure prevention process was executed, the road-width-direction behavior being recognized from the lane departure prevention information and the vehicle behavioral information.

3. The road information processing system according to claim 1, wherein the processor, by the function of the obstacle recognition unit, determines whether the obstacle is present or not, based on whether there is a behavior of the vehicle returning to the own lane, which is recognized from the road-width-direction behavior, or a time point at which the behavior of the vehicle returning to the own lane is recognized from the road-width-direction behavior.

4. The road information processing system according to claim 3, wherein the processor, by the function of the obstacle recognition unit, determines that the obstacle is present if the behavior of the vehicle returning to the own lane was not recognized from the road-width-direction behavior, or if an elapsed time from a start of the lane departure prevention process to the time point at which the behavior of the vehicle returning to the own lane was recognized from the road-width-direction behavior is equal to or more than a predetermined time.

5. The road information processing system according to claim 1, wherein the processor, by the function of the obstacle recognition unit, estimates a type of the obstacle is a vehicle parked on a shoulder of the road when the point where the obstacle was recognized is around a store.

6. The road information processing system according to claim 1, wherein the processor, by the function of the obstacle recognition unit, estimates a type of the obstacle, based on a time during which the obstacle present at a same point is continuously recognized a plurality of times based on a plurality of pieces of the lane departure prevention information about a plurality of the vehicle, and the vehicle behavioral information.

7. The road information processing system according to claim 1, wherein the processor, by the function of the obstacle recognition unit, estimates a type of the obstacle is a vehicle parked on a shoulder of the road when a time point at which the obstacle was recognized is a Saturday or Sunday, and estimates a type of the obstacle is roadwork when the time point at which the obstacle was recognized is at night.

* * * * *